(12) United States Patent
Perlmutter et al.

(10) Patent No.: US 6,640,189 B2
(45) Date of Patent: Oct. 28, 2003

(54) METHOD OF IMPROVING SATELLITE REACQUISITION PERFORMANCE FOR INTEGRATED GP/IG NAVIGATIONAL SYSTEMS

(75) Inventors: Michael S. Perlmutter, Sherborn, MA (US); Ian Humphrey, Foxboro, MA (US)

(73) Assignee: Fibersense Technology Corporation, Canton, MA (US)

( * ) Notice: Subject to any disclaimer, the term of this patent is extended or adjusted under 35 U.S.C. 154(b) by 0 days.

(21) Appl. No.: 09/955,609

(22) Filed: Sep. 19, 2001

(65) Prior Publication Data

US 2002/0169550 A1 Nov. 14, 2002

Related U.S. Application Data

(60) Provisional application No. 60/290,045, filed on May 11, 2001.

(51) Int. Cl.[7] .............................................. G01C 21/00
(52) U.S. Cl. ...................... 701/214; 701/215; 701/216
(58) Field of Search .................................. 701/213, 214, 701/215, 216; 342/357.01, 357.02, 357.12, 357.15, 357.14, 387; 370/324, 350, 503; 375/136, 139; 368/28, 47; 455/12.1, 427, 428

(56) References Cited

U.S. PATENT DOCUMENTS

| | | | |
|---|---|---|---|
| 5,185,610 A | 2/1993 | Ward et al. ................. 342/357 |
| 5,777,580 A | 7/1998 | Janky et al. ................ 342/457 |
| 6,018,704 A | 1/2000 | Kohli et al. ................. 702/149 |
| 6,041,280 A | 3/2000 | Kohli et al. ................. 701/201 |
| 6,125,325 A | 9/2000 | Kohli .......................... 701/213 |
| 6,133,874 A * | 10/2000 | Krasner .................. 342/357.15 |
| 6,181,912 B1 * | 1/2001 | Miller et al. ................ 455/12.1 |
| 6,222,483 B1 * | 4/2001 | Twitchell et al. ....... 342/357.09 |
| 6,243,409 B1 * | 6/2001 | Fenton et al. ................ 375/137 |
| 6,300,899 B1 * | 10/2001 | King ....................... 342/357.12 |
| 6,323,804 B1 * | 11/2001 | Kurby et al. ........... 342/357.06 |
| 6,353,412 B1 * | 3/2002 | Soliman ....................... 342/387 |
| 6,369,753 B1 * | 4/2002 | Schucker et al. ....... 342/357.12 |
| 6,418,158 B1 * | 7/2002 | Vishwanath et al. ........ 375/139 |
| 6,424,914 B1 * | 7/2002 | Lin ............................. 701/214 |
| 6,429,811 B1 * | 8/2002 | Zhao et al. ............ 342/357.09 |
| 6,433,739 B1 * | 8/2002 | Soliman ..................... 342/387 |

\* cited by examiner

Primary Examiner—Yonel Beaulieu

(57) ABSTRACT

A method of reacquiring a satellite signal within an integrated GP/IG navigation system includes detecting a loss of synchronization between a timing code in the satellite signal and a corresponding reference timing code. The method includes receiving position data from an inertial guidance unit. The position data is representative of an estimated position (and its associated uncertainty) of the navigation system. The method also includes estimating a distance from the navigation system to the satellite, as a function of the position data, and deriving an initial delay from the distance. The method includes delaying the reference timing code, with respect to the timing code embedded in the satellite signal, by an offset delay substantially equal to the initial delay. The method includes incrementally varying the offset delay until the timing code embedded in the satellite signal is synchronized with the reference timing code, or until the offset delay equals a predetermined end limit value.

44 Claims, 5 Drawing Sheets

METHOD OF IMPROVING SATELLITE REACQUISITION PERFORMANCE FOR INTEGRATED GP/IG NAVIGATIONAL SYSTEMS

CROSS-REFERENCE TO RELATED APPLICATIONS

This application claims the benefit of U.S. Provisional Application No. 60/290,045 entitled "METHOD FOR IMPROVING SATELLITE REACQUISITION FOR INTEGRATED GP/IP NAVIGATION SYSTEM" filed on May 11, 2001, the disclosure of which is entirely incorporated herein by reference.

STATEMENT REGARDING FEDERALLY SPONSORED RESEARCH

Not Applicable

REFERENCE TO MICROFICHE APPENDIX

Not Applicable

BACKGROUND OF THE INVENTION

The present invention relates to Global Positioning Systems (GPS), and more particularly, to methods of improving GPS satellite acquisition and reacquisition performance by utilizing navigation information from an integrated Global Positioning/Inertial Guidance (referred to herein as "GP/IG") navigation system.

In order to provide position information, a GPS receiver must acquire four or more satellites from the GPS constellation. "Acquiring" a satellite means to synchronize to a timing code that the satellite produces. Typically the timing code from the satellite includes a pseudo-random (PR) data stream embedded in a waveform that the satellite continuously broadcasts. Each satellite in the GPS constellation is characterized by a unique PR code, and the transmission of that code begins at a particular time each day. Thus, synchronizing to a particular PR code from a satellite identifies the particular satellite, and provides time-of-day (TOD) information accurate to within the propagation delay from the satellite to the receiver. The GPS receiver independently maintains the same PR code that the satellite produces. The PR code that the GPS receiver receives from the satellite is delayed with respect to the code maintained in GPS receiver due to the propagation delay from the satellite to the receiver. To acquire the satellite, the GPS receiver delays its own version of the PR code with respect to the code it receives from the satellite until the codes match. The amount of delay the receiver adds corresponds to the propagation delay (and thus the distance) to the satellite.

In order to acquire a satellite (or reacquire if the satellite signal drops out for an extended period), the GPS receiver must "guess" an initial delay, then incrementally increase the delay while searching for a code match. The better the guess, the shorter the time needed to match the codes and declare acquisition. Since the delay is directly related to the distance from the receiver to the satellite, an accurate estimate of the distance to the satellite may be used to generate an accurate guess of the initial delay.

GPS navigation systems are widely used and are rapidly being incorporated into many newly manufactured commercial vehicles. Such vehicles often operate in city environments, however, resulting in substantial blackout periods while in so-called "urban canyons," i.e., while between tall buildings that obscure the line-of-sight to one or more of the GPS satellites. Further, due to the nature of such city environments, a satellite may come into view for brief periods, sometimes only fractions of a second, in the gaps created by cross streets. Prior art search techniques generally require too much time to find the delay value required for synchronization with the satellite signal to take advantage of these brief windows of opportunity in which the satellite is in view. FIG. 1 illustrates a block diagram of a prior art GPS navigation unit 10 receiving a first signal 12 from first satellite 20, a second signal 14 from second satellite 22, third signal 16 from third satellite 24 and fourth signal 18 from fourth satellite 26. GPS navigation unit 10 includes an antenna 28, an RF receiver 30, an RF amplifier 32, a GPS system digital signal processor (DSP) 34, a correlator 36, reference PR patterns 38.

In operation, antenna 28 receives the first signal 12 from the first satellite 20 and communicates the signal 12 to RF receiver 30. The RF amplifier 32 amplifies the signal 12 from the receiver 30 and passes the signal 12 to the GPS DSP 34, the digital signal processor for the entire GPS unit. The DSP 34 includes a correlator 36 that incrementally compares the pseudo random code embedded in the first signal 12 from first satellite 20 to all of the stored bit patterns 38 and provides an indication (i.e., a correlation peak) when a match occurs. Stored bit patterns 38 are complete, time-dependent listings of the pseudo random code "signatures" used to uniquely identify each satellite. The DSP 34 shifts each of the stored bit patterns 38 in time against the first signal 12 until the correlator 36 indicates a match. A match in the codes identifies the first satellite 20, and the amount of shift delay indicates the amount of propagation delay between the satellite and the GPS unit 10. Once the DSP 34 indicates a match, the first satellite 20 is "acquired." Typical prior art GPS receivers include multiple processing channels (i.e., multiple correlators) that simultaneously search through the possible PR codes to acquire multiple satellites. Only one such channel is shown in FIG. 1. Once all four (or more) satellites are acquired, the GPS unit 10 determines its position by way of triangulation methods well known in the art.

When the line of sight to one of the four satellites is obstructed (e.g., a building lies between the satellite and the GPS unit), the signal from that satellite "drops out," i.e., the obstruction attenuates the signal amplitude so that the receiver can no longer detect it. When the line of sight to the satellite is restored, the GPS unit must reacquire the satellite before position data will again be available. The prior art reacquisition algorithms typically begin searching for the lost satellite signal by incrementally delaying the corresponding PR code through the correlator (as described herein), with respect to an initial delay value, until a correlation peak occurs. In some prior art systems, the initial delay value is simply set to zero, i.e., the algorithm assumes no prior knowledge of the satellite location with respect to the GPS receiver. Other prior art systems may estimate the initial delay as the last delay used in the correlator prior to the signal dropping out. In either case, the amount of time necessary to reacquire the satellite may be substantial, especially if the position of the GPS receiver has significantly changed. Hence, a general need exists for a method of improving the acquisition and reacquisition performance of GPS receiving systems. It is an object of the present invention to substantially overcome the above-identified disadvantages and drawbacks of the prior art.

U.S. Pat. No. 6,125,325, entitled "GPS receiver with cross-track hold," assigned to SiRF Technology, Inc. (Santa Clara, Calif.), describes a terrestrial C/A code GPS receiver system that derives along track position information while tracking as few as two GPS satellites by use of conventional altitude hold and a cross track hold mode in which the maximum expected deviation of the vehicle from the expected track is estimated by, for example, knowledge or prediction of the width of the roadway or other track. To maintain accuracy, cross track hold is alternated with clock hold to update the cross track estimate when changes in vehicle direction are detected or when a predetermined period has elapsed.

U.S. Pat. No. 6,041,280, entitled "GPS car navigation system," assigned to SiRF Technology, Inc. (Santa Clara, Calif.), describes a GPS car navigation system that derives GPS position update information from motion of the car along the actual track. Turns along the track are detected when they actually occur and are compared with the predicted turns so that the time and position at the actual turn can be used to update the then current GPS derived position of the vehicle. Updating position information with actual turn data improves the accuracy of GPS navigation especially during single satellite navigation.

U.S. Pat. No. 6,018,704 entitled "GPS receiver," (no assignee listed)—first inventor: Kohli; Sanjai (Manhattan Beach, Calif.), describes a terrestrial C/A code GPS receiver system that operates as an odometer to measure vehicle distance traveled by processing signals from GPS satellites to determine along track information relative to the track being followed by the vehicle and accumulative and displaying along track position information as an odometer.

U.S. Pat. No. 5,777,580 entitled "Vehicle location system," assigned to Trimble Navigation Limited (Sunnyvale, Calif.) describes a method and apparatus for determining vehicle present location using a location determination system (LDS), such as GPS, GLONASS, Loran or an inertial navigation system, that receives LDS signals from two or more sources. An LDS signal antenna and receiver/processor, an interrogation signal (IS) receiver means and IS responder means are electrically connected and carried on the vehicle. When a vehicle trigger event occurs, a specified vehicle IS is broadcast and is received by the IS receiver means. The IS receiver means causes the LDS receiver/processor to obtain vehicle present location information and to provide such information for the IS responder means, for transmission to an IS contact receiver (selected based upon vehicle present location). The IS receiver means and IS responder means are independently selected to be a cellular phone receiver, a paging signal receiver, a WAN/LAN workstation, or an Earth-satellite-Earth radiowave link, such as ORBCOMM.SM. Optionally, the LDS receiver/processor is kept in a "sleeper" mode, to conserve power until the IS receiver receives and responds to the specified IS, or is periodically activated to update the LDS antenna present location. Presence of the LDS equipment, IS receiver means and/or IS responder means are concealed on the vehicle. In another embodiment, a trigger event sensor is positioned on the vehicle and the responder means is caused to transmit to the vehicle present location information when a vehicle trigger event occurs, such as unauthorized movement of or entry into the vehicle, or collision of the vehicle.

U.S. Pat. No. 5,185,610 entitled "GPS system and method for deriving pointing or attitude from a single GPS receiver," assigned to Texas Instruments Incorporated (Dallas, Tex.) describes a GPS single-receiver pointing/attitude system that derives pointing/attitude measurements by correlating a selected GPS code (either P or C/A), recovered from GPS navigation signals using a single GPS receiver with multiple GPS antennas (a reference antenna and at least two slave antennas for pointing or three for attitude). For a two antenna pointing application, the GPS receiver includes, for each receiver channel, the incoming GPS signals are applied to three code correlators assigned to the reference antenna, and three code correlators assigned to the slave antenna, which provide corresponding reference and slave I and Q correlation outputs. The single-receiver pointing technique involves: (a) using the reference I and Q correlation outputs to establish a conventional reference antenna tracking loop; and (b) processing the reference and slave I and Q correlation outputs (using differential carrier Doppler phase or code phase measurements) to determine phase differences from which pointing can be computed

SUMMARY OF THE INVENTION

The foregoing and other objects are achieved by the invention which in one aspect comprises a method of reacquiring a satellite signal within an integrated GP/IG navigation system. The method includes detecting a loss of synchronization between a PR code embedded in the satellite signal and a corresponding reference PR code. The method includes receiving position data from an inertial guidance unit. The position data is representative of an estimated position of the GP/IG navigation system. The method also includes estimating a distance value, corresponding to the distance from the GP/IG navigation system to the satellite, as a function of the position data, and deriving an initial delay value from the distance value. In one embodiment, the method also includes deriving the uncertainty in the position estimate. This uncertainty is used to determine the width of a search window within which the code tracking loops should search for the satellite. The smaller the search window the shorter the re-acquisition time should be. The width of the search window can be predicted by making use of the position uncertainty computed by the Kalman filter. The method further includes delaying the reference PR code, with respect to the PR code embedded in the satellite signal, by an offset delay value substantially equal to the initial delay value. The method includes incrementally varying the offset delay value (i) until the PR code embedded in the satellite signal is synchronized with the reference PR code, or (ii) until the offset delay value equals a predetermined end limit value.

Another embodiment of the invention further includes increasing the offset delay value until the PR code embedded in the satellite signal is synchronized with the reference PR code, or until the offset delay value equals a predetermined start limit value.

Another embodiment of the invention further includes decreasing the offset delay value until the PR code embedded in the satellite signal is synchronized with the reference PR code, or until the offset delay value equals a predetermined start limit value.

Another embodiment of the invention further includes incrementally varying the offset delay value within a search window. The search window includes a first edge characterized by the start limit value and a second edge characterized by the end limit value, such that the amount of delay from the first edge to the second edge defines the window length.

Another embodiment of the invention further includes determining the window length, wherein the window length is a fixed value.

In another embodiment of the invention, the fixed value is a predetermined function of one or more static parameters of the GP/IG navigation system.

In another embodiment of the invention, the one or more static parameters are selected from the group consisting of the accuracy of an associated gyroscope set, the accuracy of an associated odometer, and combinations thereof.

Another embodiment of the invention further includes determining a window length, wherein the window length is a variable.

In another embodiment of the invention, the variable is a predetermined function of one or more dynamic parameters associated with the GP/IG navigation system.

In another embodiment of the invention, the one or more dynamic parameters are selected from the group consisting of (i) an amount of time the loss of synchronization has lasted, (ii) a figure of merit associated with the position data, (iii) a degradation value characterizing an associated gyroscope set, (iv) a degradation value characterizing an associated odometer, and combinations thereof.

Another embodiment of the invention further includes correlating the PR code embedded in the satellite signal with the corresponding PR code, providing a correlation output representative of an extent of correlation between the PR code embedded in the satellite signal and the corresponding PR code, and comparing the correlation output to a predetermined threshold. The loss of synchronization is detected when the correlation output is less than the predetermined threshold.

Another embodiment of the invention further includes generating the position data by combining gyroscope data and odometer data via a Kalman filter. The Kalman filter produces the position data as a function of the gyroscope data and the odometer data.

Another embodiment of the invention further includes receiving position solution data from a GPS portion of the GP/IG navigation system, providing the position solution data to the Kalman filter, combining the gyroscope data, the odometer data and the position solution data via the Kalman filter. The Kalman filter produces the position data as a function of the gyroscope data, the odometer data and the position solution data.

In another embodiment of the invention, deriving an initial delay value further includes dividing the distance value by a propagation velocity of the satellite signal.

In another aspect, the invention comprises a system for reacquiring a satellite signal within an integrated GP/IG navigation system. The system includes a synchronization detector for detecting a loss of synchronization between a PR code embedded in the satellite signal and a corresponding reference PR code. The system includes an inertial guidance unit for generating position data representative of an estimated position of the GP/IG navigation system. The system further includes a distance estimator for estimating a distance value, corresponding to the distance from the GP/IG navigation system to the satellite, as a function of the position data. The system also includes a search controller for deriving an initial delay value from the distance value. The search controller delays the reference PR code, with respect to the PR code embedded in the satellite signal, by an offset delay value substantially equal to the initial delay value. The search controller also incrementally varying the offset delay value until the PR code embedded in the satellite signal is synchronized with the reference PR code, or until the offset delay value equals a predetermined end limit value.

In another embodiment of the invention, the search controller further decreases the offset delay value until the PR code embedded in the satellite signal is synchronized with the reference PR code, or until the offset delay value equals a predetermined start limit value.

In another embodiment of the invention, the search controller further decreases the offset delay value until the PR code embedded in the satellite signal is synchronized with the reference PR code, or until the offset delay value equals a predetermined start limit value.

In another embodiment of the invention, the search controller further incrementally varies the offset delay value within a search window. The search window includes a first edge characterized by the start limit value, and a second edge characterized by the end limit value. The amount of delay from the first edge to the second edge defines a window length.

In another embodiment of the invention, the search controller further determines a window length having a fixed value.

In another embodiment of the invention, the fixed value is a predetermined function of one or more static parameters of the GP/IG navigation system.

In another embodiment of the invention, the one or more static parameters are selected from the group consisting of the accuracy of an associated gyroscope set, the accuracy of an associated odometer, and combinations thereof.

In another embodiment of the invention, the search controller further determines a variable window length.

In another embodiment of the invention, the variable window length is a predetermined function of one or more dynamic parameters associated with the GP/IG navigation system.

In another embodiment of the invention, the one or more dynamic parameters are selected from the group consisting of (i) an amount of time the loss of synchronization has lasted, (ii) a figure of merit associated with the position data, (iii) a degradation value characterizing an associated gyroscope set, (iv) a degradation value characterizing an associated odometer, and combinations thereof.

Another embodiment of the invention further includes a correlator for correlating the PR code embedded in the satellite signal with the corresponding PR code, and providing a correlation output representative of an extent of correlation between the PR code embedded in the satellite signal and the corresponding PR code. The search controller compares the correlation output to a predetermined threshold, and the synchronization detector detects the loss of synchronization when the correlation output is less than the predetermined threshold.

In another embodiment of the invention, the inertial guidance unit generates the position data by combining gyroscope data and odometer data via a Kalman filter, such that the Kalman filter produces the position data as a function of the gyroscope data and the odometer data.

In another embodiment of the invention, the Kalman filter receives position solution data from a GPS portion of the GP/IG navigation system. The Kalman filter further combines the gyroscope data, the odometer data and the position solution data so as to produce the position data as a function of the gyroscope data, the odometer data and the position solution data.

In another embodiment of the invention, the search controller derives the initial delay value by dividing the distance value by a propagation velocity of the satellite signal.

In another aspect, the invention comprises a method of acquiring a satellite signal within an integrated GP/IG navigation system. The method includes receiving system position (and rate of change of the system position, i.e., velocity) data from an inertial guidance unit. The position data is representative of an estimated position of the GP/IG navigation system. The method includes acquiring satellite position data from the associated ephemeris data. The satellite position data is representative of a position of a satellite associated with the satellite signal. The method also includes estimating a distance value, corresponding to the distance from the GP/IG navigation system to the satellite, as a function of the system position data and the satellite position data, and deriving an initial delay value from the distance value. The method includes delaying a reference PR code associated with the satellite signal, with respect to a PR code embedded in the satellite signal, by an offset delay value substantially equal to the initial delay value. The method further includes incrementally varying the offset delay value (i) until the PR code embedded in the satellite signal is synchronized with the reference PR code, or (ii) until the offset delay value equals a predetermined end limit value.

In another aspect, the invention comprises a system for acquiring a satellite signal within an integrated GP/IG navigation system. The system includes an inertial guidance unit for generating position data representative of an estimated position of the GP/IG navigation system. The system also includes the ephemeris data representative of the position of a satellite associated with the satellite signal. The system further includes a distance estimator for estimating a distance value, corresponding to the distance from the GP/IG navigation system to the satellite, as a function of the position data and the satellite position data. The system also includes a search controller for deriving an initial delay value from the distance value. The search controller also delays the reference PR code, with respect to the PR code embedded in the satellite signal, by an offset delay value substantially equal to the initial delay value. The search controller also incrementally varies the offset delay value until the PR code embedded in the satellite signal is synchronized with the reference PR code, or until the offset delay value equals a predetermined end limit value.

In another aspect, the invention comprises a system for reacquiring a satellite signal within an integrated GP/IG navigation system. The system includes detection means for detecting a loss of synchronization between a PR code embedded in the satellite signal and a corresponding reference PR code. The system includes navigational means for generating position data representative of an estimated position of the GP/IG navigation system and estimating means for estimating a distance value, corresponding to the distance from the GP/IG navigation system to the satellite, as a function of the position data. The system further includes controller means for deriving an initial delay value from the distance value. The controller means also delays the reference PR code, with respect to the PR code embedded in the satellite signal, by an offset delay value substantially equal to the initial delay value. The controller means further incrementally varies the offset delay value until the PR code embedded in the satellite signal is synchronized with the reference PR code, or until the offset delay value equals a predetermined end limit value.

In another aspect, the invention comprises a system for acquiring a satellite signal within an integrated GP/IG navigation system. The system includes navigational means for generating position data representative of an estimated position of the GP/IG navigation system, and storage means for storing satellite position data representative of a position of a satellite associated with the satellite signal. The system also includes estimating means for estimating a distance value, corresponding to the distance from the GP/IG navigation system to the satellite, as a function of the position data and the satellite position data. The system further includes controller means for deriving an initial delay value from the distance value. The controller means also delays the reference PR code, with respect to the PR code embedded in the satellite signal, by an offset delay value substantially equal to the initial delay value. The controller means further incrementally varies the offset delay value until the PR code embedded in the satellite signal is synchronized with the reference PR code, or until the offset delay value equals a predetermined end limit value.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

Figure 1:
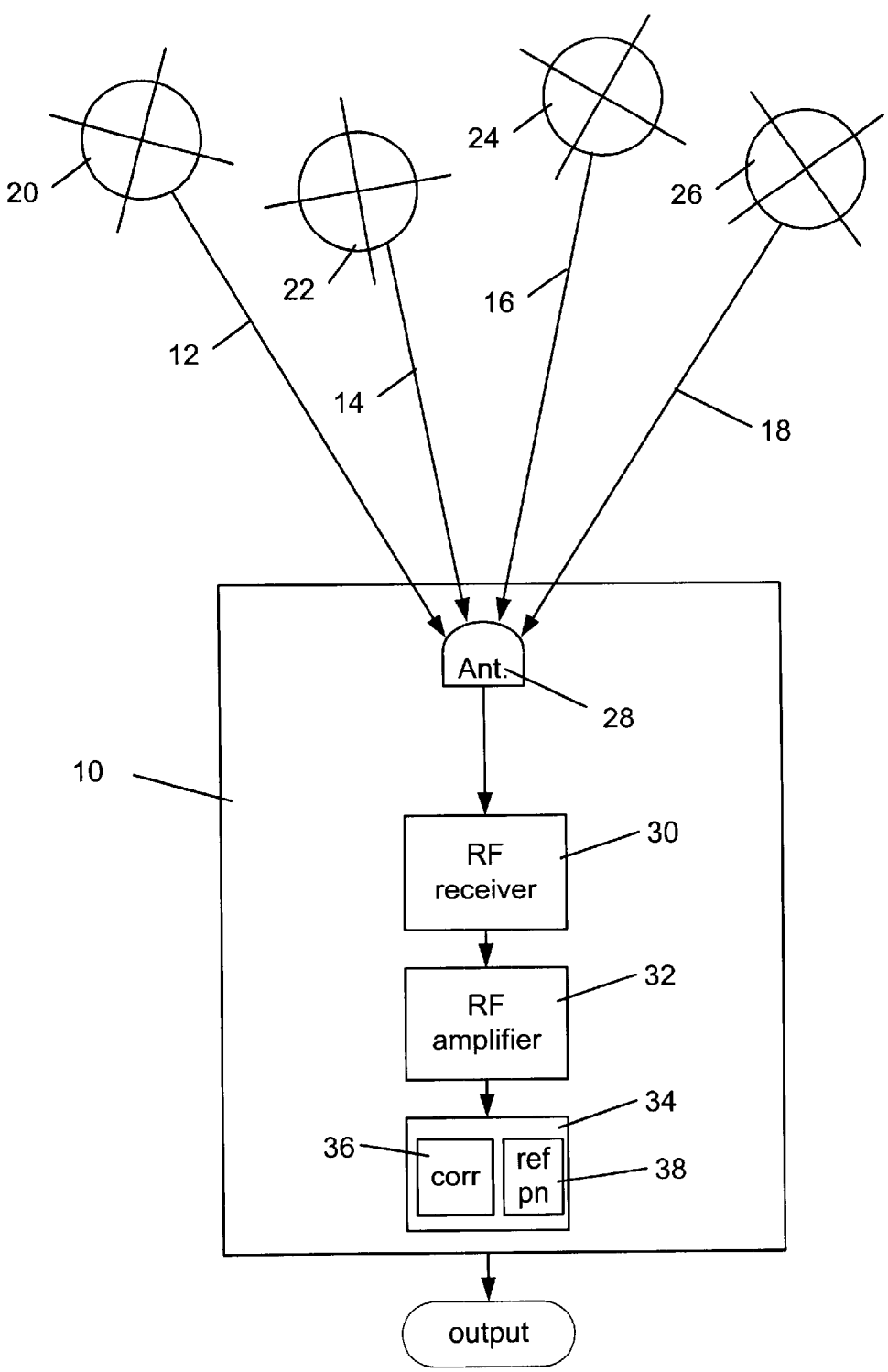
FIG. 1 illustrates a block diagram of a prior art GPS navigation unit.
Figure 2:
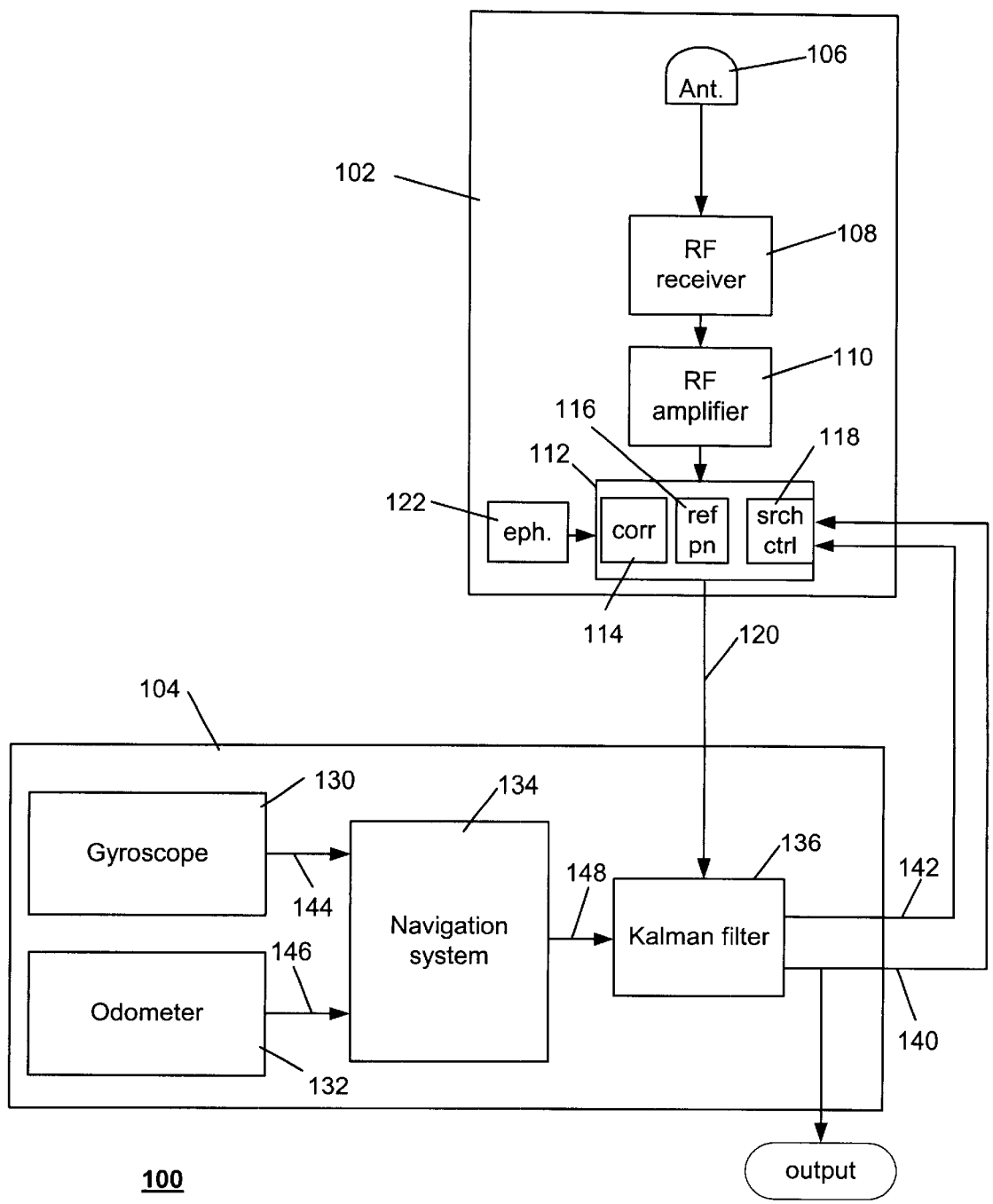
FIG. 2 shows a block diagram view of one preferred embodiment of an integrated GP/IG navigation system with improved reacquisition capability according to the present invention.
Figure 2A:
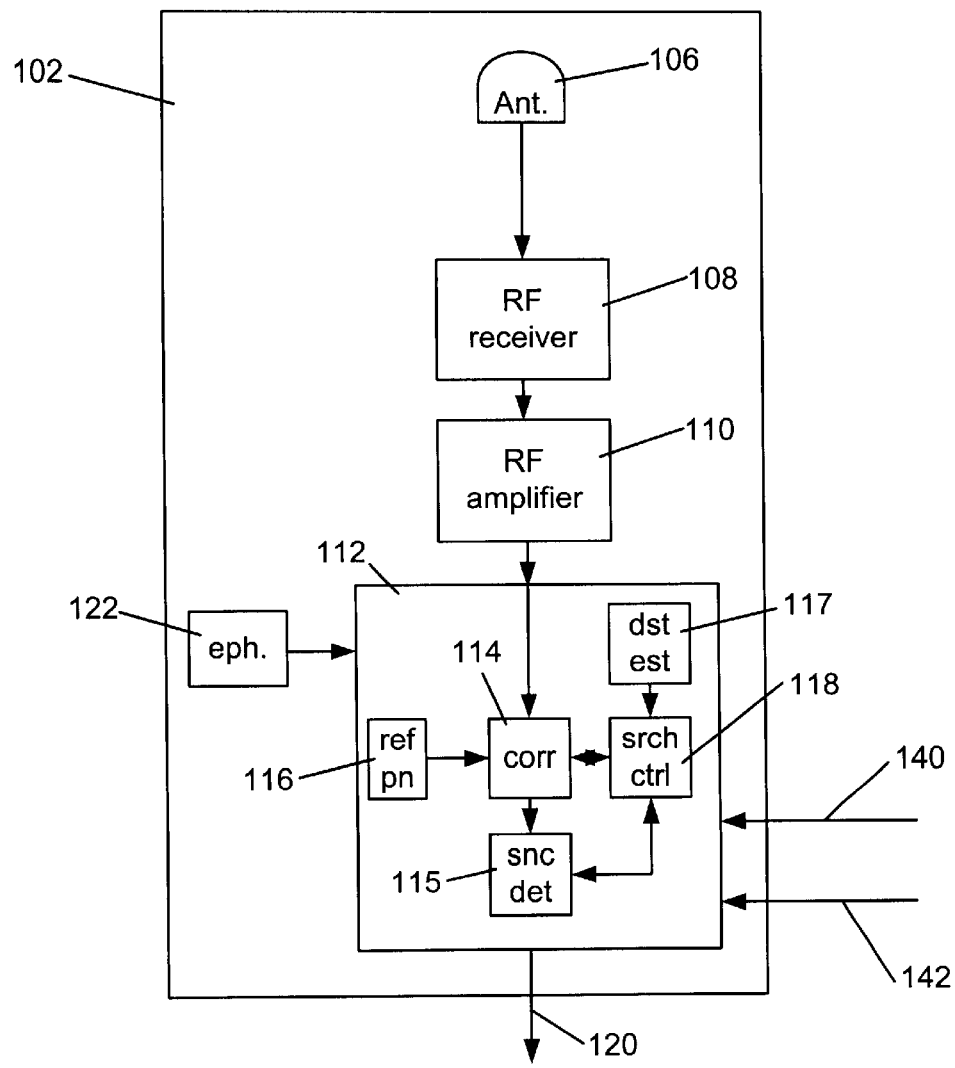
FIG. 2A illustrates the embodiment of FIG. 2 with many of the individual processing functions shown explicitly.

FIG. 2 shows a block diagram view of one preferred embodiment of an integrated Global Positioning/Inertial Guidance (referred to herein as "GP/IG") navigation system 100 (for simplicity, not all the functions of a typical GPS receiver are shown, e.g., phase tracking loops, etc.) with improved reacquisition capability according to the present invention, including a GPS unit 102 and an IG unit 104. The GPS unit 102 includes an antenna 106, an RF receiver 108, an RF amplifier 110, and a DSP unit 112. The DSP unit 112 includes a correlator 114, reference PR codes 116, and a search controller 118. In one embodiment of the invention, the DSP 112 performs many of the individual processing function described herein (e.g., a synchronization detector). FIG. 2A illustrates the embodiment of FIG. 2 with many of the individual processing functions shown explicitly. The antenna 106 receives signals transmitted by GPS satellites and passes the received signals to the RF receiver 108, which subsequently passes the received signals to the RF amplifier 110. The correlator 114 receives the amplified satellite signal from the RF amplifier 110, and operates in conjunction with the search controller 118 to search for a time-aligned match of the PR code embedded in the satellite signal with respect to one of the reference PR codes 116, so as to "acquire" the satellite. The search controller 118 utilizes predicted position data 140 from the IG unit 104 to determine a more precise starting point for the PR code search, as compared to prior art search techniques. The operation of the search controller 118 is described in more detail herein. The DSP unit 112 further receives position uncertainty factors 142 from the IG unit 104 (i.e., δx, δy, δz). When the GPS unit 102 acquires four or more satellites, the GPS unit 102 calculates position solution data 120 using triangulation techniques well known in the art, and provides the position solution data 120 to the IG unit 104.

The IG unit 104 includes a gyroscope (or set of) 130 (preferably a set of three spatially orthogonal gyroscopes and potentially up to three accelerometers), an odometer 132, a navigation system 134 and a Kalman filter 136. The gyroscopes 130 provide angular rate data 144 (also referred to herein as "gyroscope data") to the navigation system, and the odometer 132 provides distance data 146 (also referred to herein as "odometer data"), from which the navigation system 134 can derive the speed of the system 100. The navigation system 134 calculates position estimate data 148 as a function of the angular data 144 and the distance data 146, and provides the data 148 to the Kalman filter 136. The Kalman filter 136 uses the position estimate data 148 from the navigation system 134 along with the position solution 120 from the GPS unit 102 to calculate the predicted position data 140 and uncertainty factors 142 (i.e., δx, δy, δz). The Kalman filter 136 implements an optimal recursive data processing algorithm that combines all of the available input data (i.e., the position estimate data 148 and the position solution 120) to generate an overall "best estimate" of the position of the system 100. The general nature and structure of a Kalman filter has evolved over the past 40 years and is well known in the art, and is therefore not within the scope of this disclosure. Based on the relationship between the input position solution from the GPS unit 102 and the output position estimate data 148, the Kalman filter 136 also generates the uncertainty factors 142 for use by the user labeled "output" in FIG. 2. The uncertainty factors 142 provide a quantification of the uncertainty in the position estimate. This position uncertainty estimate is used to determine the width of a search window within which the code tracking loops should search for the satellite. The smaller the search window, the shorter the re-acquisition time should be.

When a satellite signal "drops out" as described herein, the DSP 112 (in particular, the search controller 118 in conjunction with the correlator 114) operates to reacquire the satellite. To reacquire the satellite, the DSP 112 must re-establish the time-aligned match of the PR code embedded in the satellite signal with the reference PR code associated with the satellite signal (i.e., re-establish synchronization between the satellite PR code and the reference PR code). Note that in the case of reacquisition, the DSP 112 has already identified the satellite's PR code during the initial acquisition. Therefore the DSP 112 does not need to search through the various reference codes to find the correct one as it did during initial acquisition. To re-establish synchronization between the satellite PR code and the reference PR code, the search controller 118 incrementally delays the reference PR code through the correlator against the code embedded in the satellite signal, beginning with an initial delay value, until a correlation peak occurs. The amount of delay at any given time is referred to herein as the "offset delay." The presence of a correlation peak indicates that the reference PR code and the satellite PR code match (i.e., are synchronized), and the satellite has been acquired. The correlation peak will be present as long as the reference PR code and the satellite PR code remain synchronized. The DSP 112 monitors the correlation peak to determine if the satellite signal drops out; the DSP 112 determines that the signal from one of the previously acquired satellites is absent when the associated correlation peak falls below a predetermined threshold.

The amount of reference PR delay present when the correlation peak occurs (referred to herein as the "acquisition delay") is indicative of the propagation delay from the satellite to the GPS unit 102, and thus of the distance from the satellite to the GPS unit 102. Ideally, if the distance to the satellite can be estimated exactly, the DSP can select the initial delay value to be equal to the acquisition delay so that no searching is necessary. The initial delay value may be calculated by dividing the known distance to the satellite by the propagation velocity of the satellite signal. The GPS unit 102 performs similar calculations in order to resolve the position of the unit 102, so relatively accurate propagation velocity values are available in the unit. Any uncertainty regarding the distance to the satellite or the propagation velocity of the signal, however, means that some searching is necessary, and the amount of uncertainty is directly proportional to the length of the "search window" that the search controller 118 uses. The search controller 118 performs a repetitive search through the search window, beginning with the initial delay of the reference PR code, and incrementally increasing or decreasing the offset delay of the reference PR code until a correlation peak occurs (i.e., the correlator output exceeds a predetermined threshold), or until the delay value reaches the limit of the window. If the delay value reaches the limit of the search window, the DSP 112 resets the delay value to the initial delay and begins the next iteration of the search. The search window is defined as the amount of incremental delay the search controller 118 adds to or subtracts from the initial delay before repeating the search. The search window is characterized by a first, leading edge corresponding to a start limit value and a second, trailing edge corresponding to an end limit value. The start limit value and the end limit value are predetermined values derived from various system parameters. In one embodiment, the length of the search window is a fixed value because the start limit value and the end limit value are both fixed values. In this embodiment, the DSP 112 determines the start limit value and the end limit value as a predetermined function one or more static parameters of the GP/IG navigation system. Such static parameters may include, but are not limited to, the known accuracy of the associated gyroscope set, the known accuracy of the associated odometer, and other parameters of the system that are not necessarily dependent on the duration of the search. In another embodiment of the invention, the search window has a variable length that is dependent on dynamic system parameters. Such dynamic system parameters may include, but are not limited to, the amount of time the loss of synchronization with the satellite signal as lasted (i.e., related to the duration of the search), or a figure of merit (FOM) associated with the position data. For example, the Kalman filter may provide a position FOM along with the position data it generates that describes the relative accuracy of the position data. The FOM may simply be the uncertainty parameters 142, or it may be derived from the uncertainty parameters along with other parameters as described herein. Other dynamic parameters may include a degradation value that characterizes the accuracy of the gyroscope set as a function of time, or a degradation value that characterizes the accuracy of the odometer as a function of time.

Figure 3:
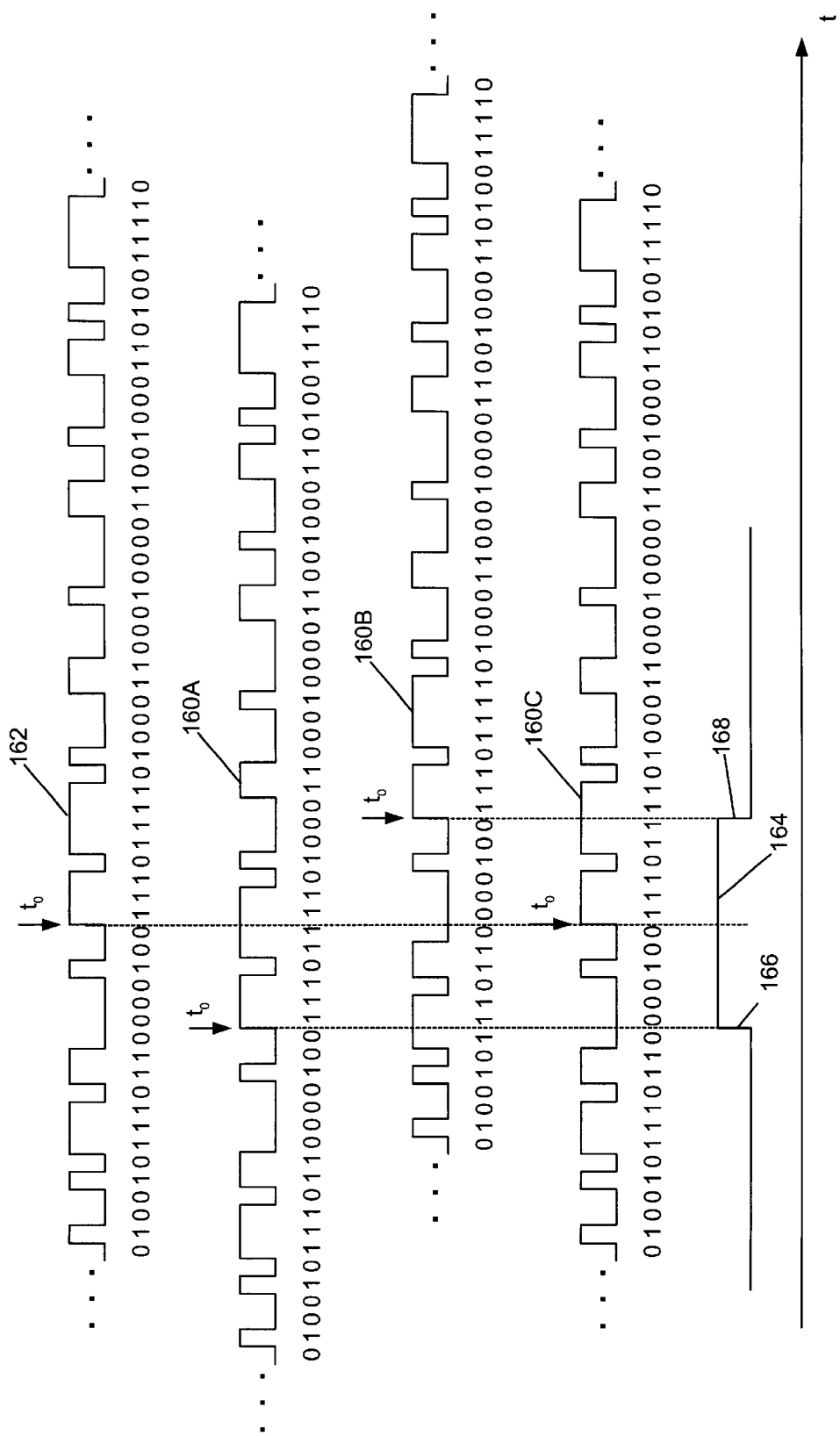
FIG. 3 shows the reference PR code at three different delays with respect to the PR code embedded in the satellite signal; and, FIG. 4 shows a flow diagram depicting a method of reacquiring satellite signal for an integrated GP/IG system.

FIG. 3 shows segments of the reference PR code 160 at three different offset delays with respect to a corresponding segment of the PR code 162 embedded in the satellite signal. An arbitrary, common reference point $t_0$ is labeled on each of the code segments. Comparing the $t_0$ points on pairs of code segments shows the relative delay of one code with respect to the other. The reference PR code segment 160A is delayed by the smallest offset delay, such that $t_0$ on reference code segment 160A occurs before $t_0$ on satellite code segment 162. The code segment 160B is delayed by the largest offset delay, such that $t_0$ on reference code segment 160B occurs after $t_0$ on satellite code segment 162. The reference code segment 160C is delayed by an offset delay equal to the acquisition delay, such that $t_0$ on reference code segment 160B occurs at the same time as $t_0$ on satellite code segment 162, and the codes are synchronized. The code segment 160C will produce a correlation peak when correlated with the satellite code segment 162. Thus, the range of offset delays is defined by the search window 164, where the leading edge 166 of the search window 164 is defined by the start limit value, and the trailing edge 168 of the search window 164 is defined by the end limit value, as described herein.

The "predetermined threshold" against which the correlator output is compared to determine a correlation peak may include a fixed threshold value, or it may include an adaptive value calculated to produce a constant false alarm rate. Such an adaptive value may be generated by a constant false alarm rate circuit (CFAR circuit) that analyzes the statistics of the of the correlator output during off-peak samples. Such CFAR circuits are well known in the art.

When the satellite signal drops out (i.e., the corresponding correlation peak drops below a predetermined threshold), as detected by the DSP 112 (functioning as a synchronization detector 115) the search controller 118 begins the repetitive search for reacquisition. The integrated GP/IG navigation system 100 uses the inertial data from the gyroscope set 130 and the odometer 132 to continuously estimate the position of the system 100 with respect to the satellite via the Kalman filter 136. The IG unit 104 provides this updated position estimate as corrected position data 140 to the DSP 112, and the DSP 112 (functioning as a distance estimator 117) uses the predicted position data 140 to determine the estimated distance to the satellite. The DSP 112 then uses the estimated distance to the satellite to determine an estimate of the acquisition delay, which the DSP 112 uses as the initial delay value. The DSP 112 subsequently initiates a repetitive search within the search window. In one embodiment, the DSP 112 uses a search window having a fixed, predetermined length that is selected as a function of the accuracy of the gyroscope set 130 and the odometer 132. In other embodiments, the DSP 112 may vary the length of the window according to various parameters. Such parameters may include (but are not limited to) the amount of time the satellite signal has been absent, figure of merit information from the Kalman filter 136, known degradation of the gyroscopes 130 or the odometer 132, and combinations thereof.

Figure 4:
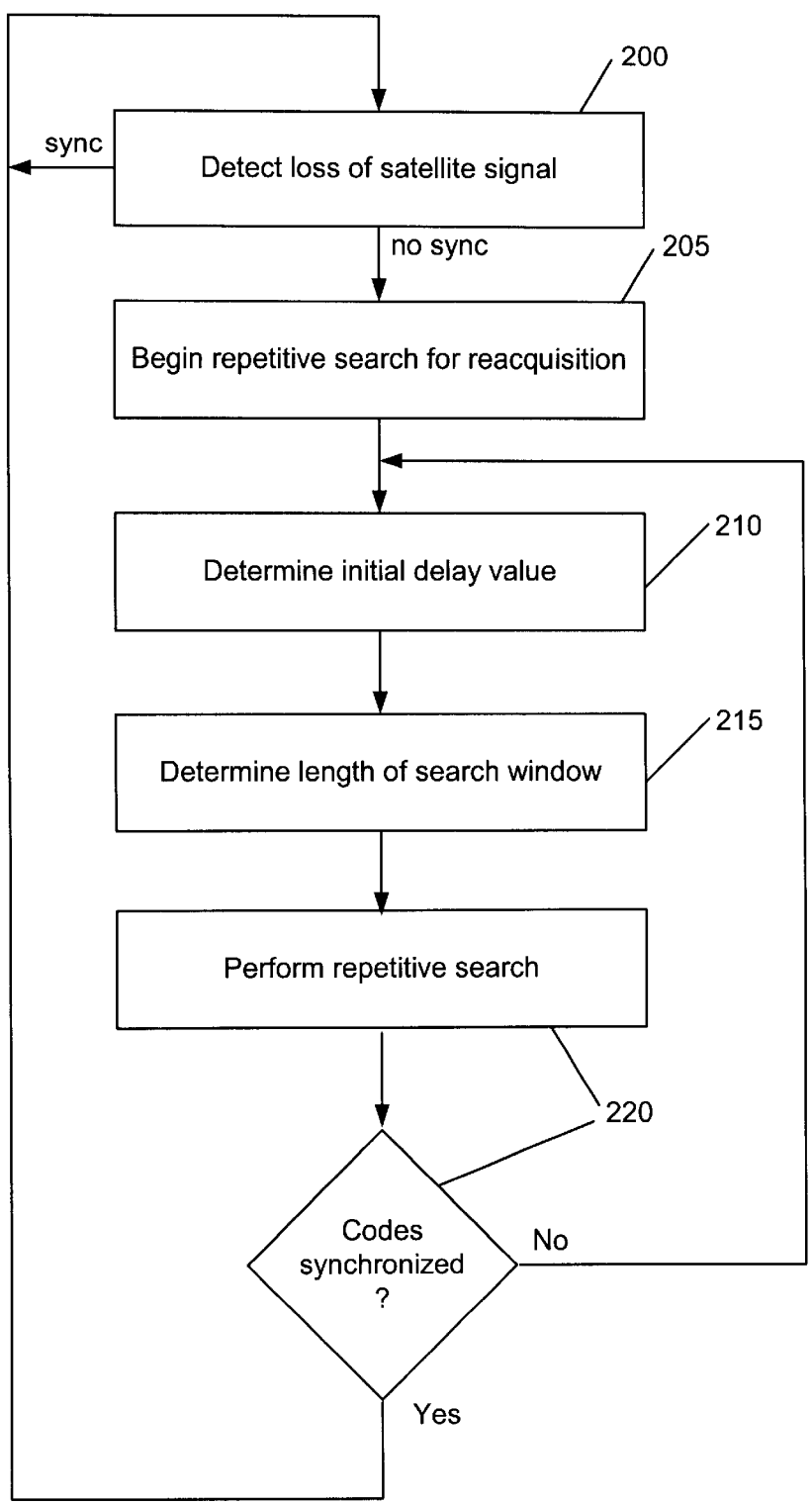

FIG. 4 shows a flow diagram depicting a method of reacquiring satellite signal for an integrated GP/IG system. The method is as follows:

Step 200 Detect loss of satellite signal—the GPS unit 102 determines that the signal from one of the previously acquired satellites is absent when the associated correlation peak falls below a predetermined threshold. Acquiring the signal from each of four satellites allows for full triangulation of position of the GPS navigational system, (relating specifically to the calibration of receiver clock bias). The system may subsequently operate on information from fewer than four satellites; the position information from the GPS unit 102 typically degrades gracefully from four signals all the way down to zero satellites, providing the maximum available GPS navigational information to the user.

Step 205 Begin repetitive search for reacquisition—the search controller 118 receives notification that the satellite signal has dropped out and consequently the associated satellite is no longer acquired. The search controller 118 proceeds by generating the search parameters as described in the following steps.

Step 210 Determine the initial delay value—the search controller 118 and the DSP 112 in general receive the predicted position data 140 from the IG unit 104 and uses the predicted position data 140 to determine the estimated distance to the satellite. The DSP 112 then uses the estimated distance to the satellite to determine an estimate of the acquisition delay, which the DSP 112 uses as the initial delay value.

Step 215 Determine length of search window—the search controller 118 and the DSP 112 performs a repetitive search within a search window. In one embodiment, the DSP 112 uses a search window having a fixed, predetermined length that is selected as a function of the accuracy of the gyroscope set 130 and the odometer 132. In other embodiments, the DSP 112 may vary the length of the window according to various parameters as described herein. In another embodiment the length of the search window can be computed from the uncertainty of the predicted position estimate. This uncertainty will vary as a function of time.

Step 220 Perform repetitive search until satellite is acquired—the search controller 118 and the DSP 112 perform the repetitive search by incrementally varying the delay of the reference PR code with respect to the associated satellite PR code until the correlator output crosses a predetermined threshold (i.e., a correlation peak of sufficient magnitude occurs), indicating a match between the reference PR code and the satellite PR code.

In one embodiment, the method described in this disclosure may also be used to perform an initial acquisition of a satellite, i.e., an acquisition when the PR code associated with the satellite is not yet known. The GPS unit 102 typically includes an almanac (and more accuractly ephemeris data) 122 that identifies the geostationary position (i.e., a fixed position with respect to an arbitrary reference point on the surface of the earth) of each satellite in the GPS constellation, along with the PR code that corresponds to the satellite. The accurate position of each satellite must be known to perform the triangulation procedure the GPS unit 102 uses to determine the position of the system 100. The DSP 112 first receives the predicted position data 140 from the IG unit 104 and compares the estimated position of the system 100 with the satellite positions in the ephemeris data 122 to determine which satellites should be in sight and available for acquisition. In some embodiments, the DSP 112 may also receive logistical information from external sources describing which directions are currently blocked by objects (such as buildings, trees, hills, etc.,) that would likely attenuate or eliminate the satellite signal. The logistical information may describe the amount or level of obstruction between the system and the satellite in quantitative terms such as total estimated attenuation, or in qualitative terms such as the type of obstruction(s) in the path (e.g., buildings, trees, etc.). The DSP 112 may use such logistical information to eliminate potential satellites from consideration for acquisition. Eliminating such satellites that are known to be blocked further reduces the acquisition search time. In one embodiment, the DSP 112 categorizes each of the potential satellites according to the amount of potential obstruction between the GP/IG navigation system and the potential satellite. The DSP 112 may then only attempt to acquire those satellites that are categorized as being less obstructed than a predetermined threshold. This predetermined threshold may be a fixed level of obstruction, or it may vary to widen the range of potential satellites if others are not acquired over time.

For each potentially available satellite, the DSP 112 uses the predicted position data 140 to determine the estimated distance to the satellite, and then uses the estimated distance to the satellite to determine an estimate of the acquisition delay. The DSP 112 uses this estimate of the acquisition delay as the initial delay value, and determines a search window (as described herein for reacquisition) surrounding the initial delay estimate. The DSP 112 then performs a repetitive search within the search window, beginning with the initial delay of the reference PR code, and incrementally increasing or decreasing the delay of the reference PR code until a correlation peak occurs (i.e., the correlator output exceeds a predetermined threshold), or until the delay value reaches the limit of the window. If the delay value reaches the limit of the search window, the DSP 112 resets the delay value to the initial delay and begins the next iteration of the search.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A method of reacquiring a satellite signal within an integrated GP/IG navigation system, comprising:
   detecting a loss of synchronization between a timing code embedded in the satellite signal and a corresponding reference timing code;
   receiving position data from an inertial guidance unit, the position data being representative of an estimated position of the GP/IG navigation system;
   estimating a distance value, corresponding to the distance from the GP/IG navigation system to the satellite, as a function of the position data, and deriving an initial delay value from the distance value; and
   delaying the reference timing code, with respect to the timing code embedded in the satellite signal, by an offset delay value substantially equal to the initial delay value, including incrementally varying the offset delay value (i) until the timing code embedded in the satellite signal is synchronized with the reference timing code, or (ii) until the offset delay value equals a predetermined end limit value.

2. A method of reacquiring a satellite signal within an integrated GP/IG navigation system, comprising:
   detecting a loss of synchronization between a timing code embedded in the satellite signal and a corresponding reference timing code;
   receiving position data from an inertial guidance unit, the position data being representative of an estimated position of the GP/IG navigation system;
   estimating a distance value, corresponding to the distance from the GP/IG navigation system to the satellite, as a function of the position data, and deriving an initial delay value from the distance value; and
   delaying the reference timing code, with respect to the timing code embedded in the satellite signal, by an offset delay value substantially equal to the initial delay value, including increasing the offset delay value (i) until the timing code embedded in the satellite signal is synchronized with the reference timing code, or (ii) until the offset delay value equals a predetermined start limit value.

3. A method of reacquiring a satellite signal within an integrated GP/IG navigation system, comprising:
   detecting a loss of synchronization between a timing code embedded in the satellite signal and a corresponding reference timing code;
   receiving position data from an inertial guidance unit, the position data being representative of an estimated position of the GP/IG navigation system;
   estimating a distance value, corresponding to the distance from the GP/IG navigation system to the satellite, as a function of the position data, and deriving an initial delay value from the distance value; and
   delaying the reference timing code, with respect to the timing code embedded in the satellite signal, by an offset delay value substantially equal to the initial delay value, including decreasing the offset delay value (i) until the timing code embedded in the satellite signal is synchronized with the reference timing code, or (ii) until the offset delay value equals a predetermined start limit value.

4. A method of reacquiring a satellite signal within an integrated GP/IG navigation system, comprising:
   detecting a loss of synchronization between a timing code embedded in the satellite signal and a corresponding reference timing code;
   receiving position data from an inertial guidance unit, the position data being representative of an estimated position of the GP/IG navigation system;
   estimating a distance value, corresponding to the distance from the GP/IG navigation system to the satellite, as a function of the position data, and deriving an initial delay value from the distance value; and
   delaying the reference timing code, with respect to the timing code embedded in the satellite signal, by an offset delay value substantially equal to the initial delay value, further including incrementally varying the offset delay value within a search window, wherein the search window includes a first edge occurring at a predetermined start limit value and a second edge occurring at a predetermined end limit value, such that an amount of delay from the first edge to the second edge defines a window length.

5. A method according to claim 4, further including calculating an uncertainty estimate of the predicted position, and calculating an optimal width of the search window as a function of the uncertainty estimate.

6. A method according to claim 4, wherein the window length is a fixed value.

7. A method according to claim 6, wherein the fixed value is a predetermined function of one or more static parameters of the GP/IG navigation system.

8. A method according to claim 7, wherein the one or more static parameters are selected from the group consisting of the accuracy of an associated gyroscope set, the accuracy of an associated odometer, and combinations thereof.

9. A method according to claim 4, wherein the window length is a variable.

10. A method according to claim 9, wherein the variable is a predetermined function of one or more dynamic parameters associated with the GP/IG navigation system.

11. A method according to claim 10, wherein the one or more dynamic parameters are selected from the group consisting of (i) an amount of time the loss of synchronization has lasted, (ii) a figure of merit associated with the position data, (iii) a degradation value characterizing an associated gyroscope set, (iv) a degradation value characterizing an associated odometer, and combinations thereof.

12. A system for reacquiring a satellite signal within an integrated GP/IG navigation system, comprising:
   a synchronization detector for detecting a loss of synchronization between a timing code embedded in the satellite signal and a corresponding reference timing code;
   an inertial guidance unit for generating position data representative of an estimated position of the GP/IG navigation system;
   a distance estimator for estimating a distance value, corresponding to the distance from the GP/IG navigation system to the satellite, as a function of the position data;
   a search controller for (i) deriving an initial delay value from the distance value, (ii) delaying the reference timing code, with respect to the timing code embedded in the satellite signal, by an offset delay value substantially equal to the initial delay value, and (iii) incrementally varying the offset delay value until the timing code embedded in the satellite signal is synchronized with the reference timing code, or until the offset delay value equals a predetermined end limit value.

13. A system according to claim 12, wherein the search controller further decreases the offset delay value until the timing code embedded in the satellite signal is synchronized with the reference timing code, or until the offset delay value equals a predetermined start limit value.

14. A system according to claim 12, wherein the timing code includes a PR code.

15. A system according to claim 12, wherein the search controller further increases the offset delay value until the timing code embedded in the satellite signal is synchronized with the reference timing code, or until the offset delay value equals a predetermined end limit value.

16. A system according to claim 12, wherein the search controller further incrementally varies the offset delay value within a search window, the search window including a first edge occurring at a predetermined start limit value and a second edge occurring at a predetermined end limit value, such that an amount of delay from the first edge to the second edge defines a window length.

17. A system according to claim 16, wherein the search controller receives an uncertainty estimate of the predicted position, and calculates an optimal width of the search window as a function of the uncertainty estimate.

18. A system according to claim 16, wherein the window length has a fixed value.

19. A system according to claim 18, wherein the fixed value is a predetermined function of one or more static parameters of the GP/IG navigation system.

20. A system according to claim 19, wherein the one or more static parameters are selected from the group consisting of the accuracy of an associated gyroscope set, the accuracy of an associated odometer, and combinations thereof.

21. A system according to claim 16, wherein the window has a variable window length.

22. A system according to claim 21, wherein the variable window length is a predetermined function of one or more dynamic parameters associated with the GP/IG navigation system.

23. A system according to claim 22, wherein the one or more dynamic parameters are selected from the group consisting of (i) an amount of time the loss of synchronization has lasted, (ii) a figure of merit associated with the position data, (iii) a degradation value characterizing an associated gyroscope set, (iv) a degradation value characterizing an associated odometer, and combinations thereof.

24. A system according to claim 12, further including a correlator for correlating the timing code embedded in the satellite signal with the corresponding timing code, and providing a correlation output representative of an extent of correlation between the timing code embedded in the satellite signal and the corresponding timing code, wherein the search controller compares the correlation output to a predetermined threshold, and the synchronization detector detects the loss of synchronization when the correlation output is less than the predetermined threshold.

25. A system according to claim 12, further including one or more gyroscopes for providing gyroscope data, one odometer (or one or more accelerometers) for providing odometer data (or acceleration data), and a Kalman filter, wherein the inertial guidance unit generates the position data by combining the gyroscope data and the odometer data via the Kalman filter, such that the Kalman filter produces the position data as a function of the gyroscope data and the odometer data.

26. A system according to claim 25, wherein the Kalman filter receives position solution data from a GPS portion of the GP/IG navigation system, and combines the gyroscope data, the odometer data and the position solution data so as to produce the position data as a function of the gyroscope data, the odometer data and the position solution data.

27. A system according to claim 12, wherein the search controller derives the initial delay value by dividing the distance value by a propagation velocity of the satellite signal.

28. A method of acquiring a satellite signal within an integrated GP/IG navigation system, comprising:
   receiving system position data from an inertial guidance unit, the position data being representative of an estimated position of the GP/IG navigation system;
   acquiring satellite position data from an almanac (and the ephemeris data), the satellite position data being representative of a position of a satellite associated with the satellite signal;
   estimating a distance value, corresponding to the distance from the GP/IG navigation system to the satellite, as a function of the system position data and the satellite position data, and deriving an initial delay value from the distance value;
   delaying a reference timing code associated with the satellite signal, with respect to a timing code embedded in the satellite signal, by an offset delay value substantially equal to the initial delay value, including incrementally varying the offset delay value (i) until the timing code embedded in the satellite signal is synchronized with the reference timing code, or (ii) until the offset delay value equals a predetermined end limit value.

29. A method of acquiring a satellite signal within an integrated GP/IG navigation system, comprising:
   receiving system position data from an inertial guidance unit, the position data being representative of an estimated position of the GP/IG navigation system;
   acquiring satellite position data from an almanac (and the ephemeris data), the satellite position data being representative of a position of a satellite associated with the satellite signal;

estimating a distance value, corresponding to the distance from the GP/IG navigation system to the satellite, as a function of the system position data and the satellite position data, and deriving an initial delay value from the distance value;

delaying a reference timing code associated with the satellite signal, with respect to a timing code embedded in the satellite signal, by an offset delay value substantially equal to the initial delay value, including increasing the offset delay value (i) until the timing code embedded in the satellite signal is synchronized with the reference timing code, or (ii) until the offset delay value equals a predetermined start limit value.

30. A method of acquiring a satellite signal within an integrated GP/IG navigation system, comprising:

receiving system position data from an inertial guidance unit, the position data being representative of an estimated position of the GP/IG navigation system;

acquiring satellite position data from an almanac (and the ephemeris data), the satellite position data being representative of a position of a satellite associated with the satellite signal;

estimating a distance value, corresponding to the distance from the GP/IG navigation system to the satellite, as a function of the system position data and the satellite position data, and deriving an initial delay value from the distance value;

delaying a reference timing code associated with the satellite signal, with respect to a timing code embedded in the satellite signal, by an offset delay value substantially equal to the initial delay value, including decreasing the offset delay value (i) until the timing code embedded in the satellite signal is synchronized with the reference timing code, or (ii) until the offset delay value equals a predetermined start limit value.

31. A method of acquiring a satellite signal within an integrated GP/IG navigation system, comprising:

receiving system position data from an inertial guidance unit, the position data being representative of an estimated position of the GP/IG navigation system;

acquiring satellite position data from an almanac (and the ephemeris data), the satellite position data being representative of a position of a satellite associated with the satellite signal;

estimating a distance value, corresponding to the distance from the GP/IG navigation system to the satellite, as a function of the system position data and the satellite position data, and deriving an initial delay value from the distance value;

delaying a reference timing code associated with the satellite signal, with respect to a timing code embedded in the satellite signal, by an offset delay value substantially equal to the initial delay value, including incrementally varying the offset delay value within a search window, wherein the search window includes a first edge characterized by the start limit value and a second edge characterized by the end limit value, such that an amount of delay from the first edge to the second edge defines a window length.

32. A method according to claim 31, further including calculating an uncertainty estimate of the predicted position, and calculating an optimal width of the search window as a function of the uncertainty estimate.

33. A method according to claim 31, wherein the window length is a fixed value.

34. A method according to claim 33, wherein the fixed value is a predetermined function of one or more static parameters of the GP/IG navigation system.

35. A method according to claim 34, wherein the one or more static parameters are selected from the group consisting of the accuracy of an associated gyroscope set, the accuracy of an associated odometer, and combinations thereof.

36. A method according to claim 31, wherein the window length is a variable.

37. A method according to claim 36, wherein the variable is a predetermined function of one or more dynamic parameters associated with the GP/IG navigation system.

38. A method according to claim 37, wherein the one or more dynamic parameters are selected from the group consisting of (i) an amount of time the loss of synchronization has lasted, (ii) a figure of merit associated with the position data, (iii) a degradation value characterizing an associated gyroscope set, (iv) a degradation value characterizing an associated odometer, and combinations thereof.

39. A system for acquiring a satellite signal within an integrated GP/IG navigation system, comprising:

an inertial guidance unit for generating position data representative of an estimated position of the GP/IG navigation system;

ephemeris data for storing satellite position data representative of a position of a satellite associated with the satellite signal;

a distance estimator for estimating a distance value, corresponding to the distance from the GP/IG navigation system to the satellite, as a function of the position data and the satellite position data; and, a search controller for (i) deriving an initial delay value from the distance value, (ii) delaying the reference timing code, with respect to the timing code embedded in the satellite signal, by an offset delay value substantially equal to the initial delay value, and (iii) incrementally varying the offset delay value until the timing code embedded in the satellite signal is synchronized with the reference timing code, or until the offset delay value equals a predetermined end limit value.

40. A system for reacquiring a satellite signal within an integrated GP/IG navigation system, comprising:

detection means for detecting a loss of synchronization between a timing code embedded in the satellite signal and a corresponding reference timing code;

navigational means for generating position data representative of an estimated position of the GP/IG navigation system;

estimating means for estimating a distance value, corresponding to the distance from the GP/IG navigation system to the satellite, as a function of the position data; and, controller means for (i) deriving an initial delay value from the distance value, (ii) delaying the reference timing code, with respect to the timing code embedded in the satellite signal, by an offset delay value substantially equal to the initial delay value, and (iii) incrementally varying the offset delay value until the timing code embedded in the satellite signal is synchronized with the reference timing code, or until the offset delay value equals a predetermined end limit value.

41. A system for acquiring a satellite signal within an integrated GP/IG navigation system, comprising:

navigational means for generating position data representative of an estimated position of the GP/IG navigation system;

storage means for storing satellite position data representative of a position of a satellite associated with the satellite signal;

estimating means for estimating a distance value, corresponding to the distance from the GP/IG navigation system to the satellite, as a function of the position data and the satellite position data; and, controller means for (i) deriving an initial delay value from the distance value, (ii) delaying the reference timing code, with respect to the timing code embedded in the satellite signal, by an offset delay value substantially equal to the initial delay value, and (iii) incrementally varying the offset delay value until the timing code embedded in the satellite signal is synchronized with the reference timing code, or until the offset delay value equals a predetermined end limit value.

42. A method of acquiring a satellite signal within an integrated GP/IG navigation system, comprising:

generating position data representative of an estimated position of the GP/IG navigation system by (i) receiving position solution data from a GPS portion of the GP/IG navigation system, and (ii) combining gyroscope data, odometer data and the position solution data via a Kalman filter, such that the Kalman filter produces the position data as a function of the gyroscope data, the odometer data and the position solution data;

acquiring satellite position data representative of a position of a satellite associated with the satellite signal;

estimating a distance value, corresponding to the distance from the GP/IG navigation system to the satellite, as a function of the system position data and the satellite position data, and deriving an initial delay value from the distance value;

delaying a reference timing code associated with the satellite signal, with respect to a timing code embedded in the satellite signal, by an offset delay value substantially equal to the initial delay value, and incrementally varying the offset delay value (i) until the timing code embedded in the satellite signal is synchronized with the reference timing code, or (ii) until the offset delay value equals a predetermined end limit value.

43. A system for acquiring a satellite signal within an integrated GP/IG navigation system, comprising:

an inertial guidance unit for generating position data representative of an estimated position of the GP/IG navigation system by (i) receiving position solution data from a GPS portion of the GP/IG navigation system, and (ii) combining gyroscope data, odometer data and the position solution data via a Kalman filter, such that the Kalman filter produces the position data as a function of the gyroscope data, the odometer data and the position solution data;

a distance estimator for estimating a distance value, corresponding to the distance from the GP/IG navigation system to the satellite, as a function of the position data and satellite position data representative of a position of a satellite associated with the satellite signal; and, a search controller for (i) deriving an initial delay value from the distance value, (ii) delaying the reference timing code, with respect to the timing code embedded in the satellite signal, by an offset delay value substantially equal to the initial delay value, and (iii) incrementally varying the offset delay value until the timing code embedded in the satellite signal is synchronized with the reference timing code, or until the offset delay value equals a predetermined end limit value.

44. A method of reacquiring a satellite signal within an integrated GP/IG navigation system, comprising:

detecting a loss of synchronization between a timing code embedded in the satellite signal and a corresponding reference timing code;

receiving position data from an inertial guidance unit, the position data being representative of an estimated position of the GP/IG navigation system;

calculating an uncertainty estimate of the predicted position, and calculating an optimal width of a search window as a function of the uncertainty estimate;

estimating a distance value, corresponding to the distance from the GP/IG navigation system to the satellite, as a function of the position data, and deriving an initial delay value from the distance value;

delaying the reference timing code, with respect to the timing code embedded in the satellite signal, by an offset delay value substantially equal to the initial delay value, and varying the offset delay value within the search window until the reference timing code matches the timing code embedded in the satellite signal.

* * * * *